(12) United States Patent
Misra et al.

(10) Patent No.: US 11,494,248 B2
(45) Date of Patent: Nov. 8, 2022

(54) WARM MISSION-MODE RESET IN A PORTABLE COMPUTING DEVICE

(71) Applicant: QUALCOMM INCORPORATED, San Diego, CA (US)

(72) Inventors: Rakesh Misra, Bangalore (IN); Rohit Gupta, Bengaluru (IN); Shubham Maheshwari, Jaipur (IN); Pawan Chhabra, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 433 days.

(21) Appl. No.: 16/722,861

(22) Filed: Dec. 20, 2019

(65) Prior Publication Data

US 2021/0191795 A1   Jun. 24, 2021

(51) Int. Cl.
| | |
|---|---|
| G06F 11/07 | (2006.01) |
| G06F 9/4401 | (2018.01) |
| G06F 15/78 | (2006.01) |
| G06F 1/24 | (2006.01) |
| G06F 11/14 | (2006.01) |
| G06F 11/30 | (2006.01) |
| G06F 1/3203 | (2019.01) |

(52) U.S. Cl.
CPC .......... *G06F 11/073* (2013.01); *G06F 1/3203* (2013.01); *G06F 9/4418* (2013.01); *G06F 15/7807* (2013.01)

(58) Field of Classification Search
CPC .... G06F 11/073; G06F 1/3203; G06F 9/4418; G06F 15/7807
See application file for complete search history.

(56) References Cited

U.S. PATENT DOCUMENTS

| | | | |
|---|---|---|---|
| 2005/0229020 A1* | 10/2005 | Goodman | G06F 11/0772 714/2 |
| 2008/0098205 A1* | 4/2008 | Dolve | G06F 11/0721 714/E11.003 |
| 2010/0211824 A1* | 8/2010 | Agrawal | G06F 11/0793 711/E12.008 |
| 2013/0326206 A1* | 12/2013 | Lueck | G06F 1/32 713/1 |
| 2014/0068302 A1* | 3/2014 | Falik | G06F 1/3206 713/323 |
| 2016/0231797 A1* | 8/2016 | Meir | G06F 3/0625 |

* cited by examiner

*Primary Examiner* — Phil K Nguyen
*Assistant Examiner* — Gayathri Sampath
(74) *Attorney, Agent, or Firm* — Smith Tempel Blaha LLC/Qualcomm (57) ABSTRACT

A warm mission-mode reset may be performed in a portable computing device. Assertion of a signal indicating an error condition may be detected. In response to detection of the signal indicating an error condition, a signal indicating a request to preserve memory contents may be provided to a DRAM subsystem. Then, in response to a signal acknowledging the DRAM subsystem is preserving the memory contents, a system reset signal may be asserted.

26 Claims, 5 Drawing Sheets

WARM MISSION-MODE RESET IN A PORTABLE COMPUTING DEVICE

DESCRIPTION OF THE RELATED ART

Portable computing devices ("PCDs") are becoming necessities for people on personal and professional levels. These devices may include cellular telephones, tablet computers, palmtop computers, portable digital assistants ("PDAs"), portable game consoles, and other portable electronic devices. PCDs commonly contain integrated circuits or systems-on-a-chip ("SoCs") that include numerous components designed to work together to deliver functionality to a user. For example, an SoC may contain any number of processing systems such as wireless communication modems, central processing units ("CPUs") with multiple cores, graphical processing units ("GPUs"), etc. The SoC may be coupled to other components within the PCD, such as external (to the SoC) memory systems and external communication transceivers, as well as cameras, microphones, speakers, etc.

The process of transitioning a computing device from a state in which it is powered off to a state in which it is powered on and fully operational is commonly known as a "cold reset" but may also be referred to "cold boot," "hard boot," "hard reset," or "power-on reset." A cold reset may also occur when power is cycled off and then back on. During a cold reset, all of the various processing systems and other components of the computing device are reset. If the power is cycled off and then back on, the contents of volatile memory systems, such as dynamic random access memory ("DRAM"), are not preserved. Also, during a cold reset the computing device may load operating system software. In contrast, the process of resetting a computing device that is powered on, without cycling power, is commonly known as a "warm reset" but may also be referred to as a "warm boot," "soft boot," or "soft reset."

Although the terms "warm reset," "warm boot," "soft boot," and "soft reset" are commonly used synonymously, the different terms are sometimes used to denote different types of processes by which a computing device may be reset. For example, during a type of warm reset that is commonly employed in desktop and laptop computers, most, but not all, processing systems and other components of the computing device are reset in the same manner as a cold reset. The memory system is one such system that may not be reset in the same manner during such a warm reset as it would be during a cold reset. Rather, during such a warm reset the contents of a (volatile) memory system may be saved to a non-volatile medium, such as a disk, and then re-loaded into the memory system after the system has been reset. One reason that this type of warm reset may be performed is that the processing system encountered an error condition, and it may be desirable to preserve the contents of the memory system for debugging analysis.

SUMMARY OF THE DISCLOSURE

Systems, methods and computer program products are disclosed for performing a warm reset in a portable computing device ("PCD").

An exemplary method for performing a warm reset in a PCD may include detecting assertion of a signal indicating an error condition, providing a signal indicating a request to preserve memory contents to a dynamic random access memory ("DRAM") subsystem in response to assertion of the signal indicating an error condition, and asserting a system reset signal in response to a signal acknowledging the DRAM subsystem is preserving the memory contents.

An exemplary system for performing a warm reset in a PCD may include means for detecting assertion of a signal indicating an error condition, means for providing a signal indicating a request to preserve memory contents to a DRAM subsystem in response to assertion of the signal indicating an error condition, and means for asserting a system reset signal in response to a signal acknowledging the DRAM subsystem is preserving the memory contents.

Another exemplary system for performing a warm reset in a PCD may include a memory controller configured to control a DRAM subsystem, a power management integrated circuit ("PMIC"), and warm reset logic in a system-on-chip ("SoC") of the PCD. The PMIC may be configured to receive a signal from the SoC indicating an error condition in the PCD. The warm reset logic may be configured to detect assertion of the signal directed to the PMIC indicating an error condition, and provide a signal to the memory controller indicating a request to preserve memory contents in response to assertion of the signal indicating an error condition. The PMIC may be configured to provide a system reset signal to the SoC based on a signal from the memory controller indicating the DRAM subsystem is preserving the memory contents Still another exemplary system may comprise an SoC configured to provide a warm reset in a PCD. The SoC may include warm reset logic and reset control logic. The warm reset logic may be configured to detect assertion of a signal indicating an error condition in the PCD, and provide a signal to a memory controller of a DRAM subsystem indicating a request to preserve memory contents in response to assertion of the signal indicating an error condition. The reset control logic may be configured to reset all SoC subsystems based on an acknowledgment that the DRAM subsystem is preserving the memory contents. After all SoC subsystems have been reset, the memory contents remain preserved.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
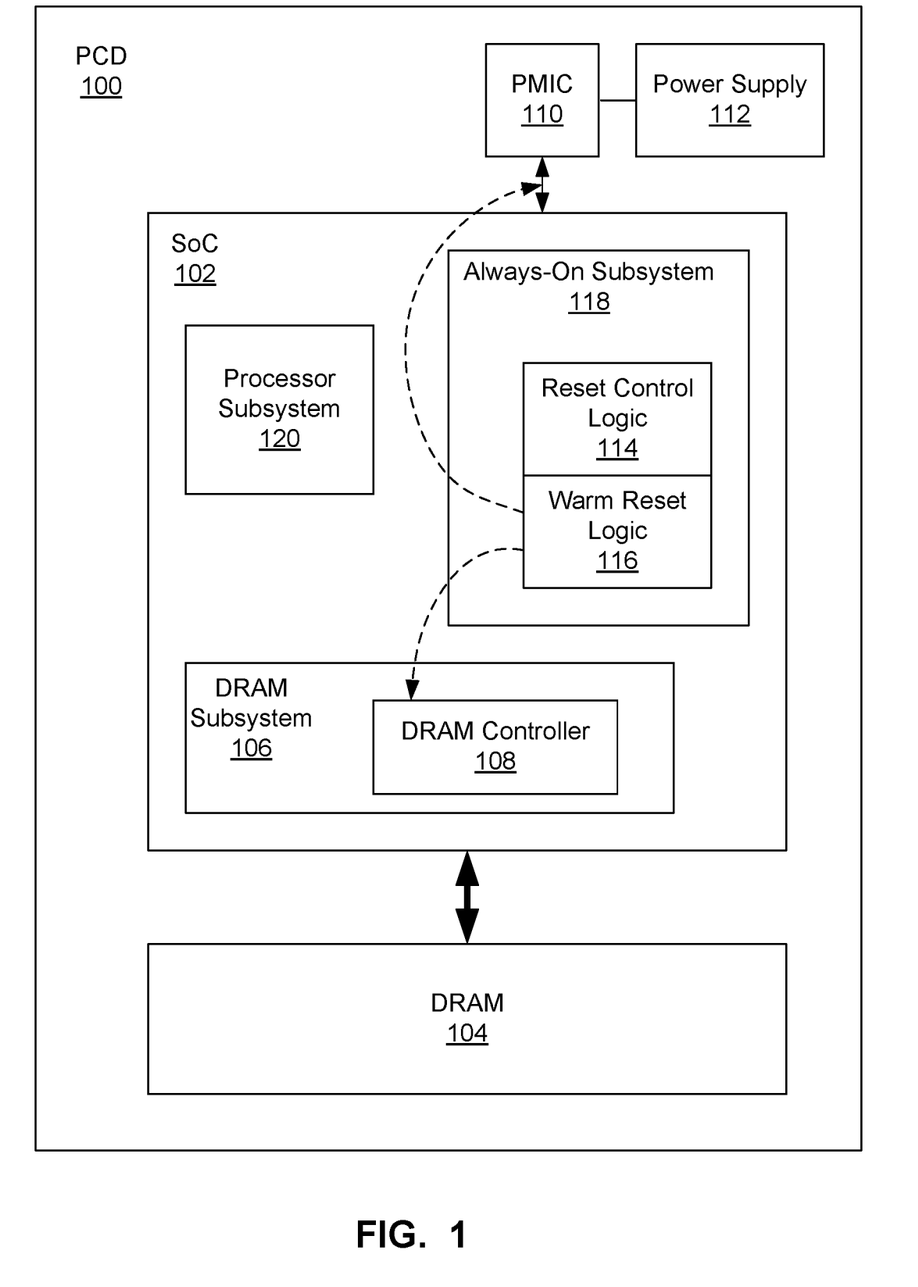
FIG. 1 is a block diagram of a PCD that includes a system having a warm mission-mode reset feature, in accordance with exemplary embodiments.

As illustrated in FIG. 1, in an illustrative or exemplary embodiment, a PCD 100 may include a system-on-chip ("SoC") 102. The PCD 100 may further include a dynamic random access memory ("DRAM") 104, such as, for example, a double data rate synchronous DRAM ("DDR-SDRAM"). The SoC 102 may include a DRAM subsystem 106 comprising a memory controller or DRAM controller 108. The SoC 102 may receive power through a power management integrated circuit ("PMIC") 110 coupled to a power supply 112. In addition to supplying power to the SoC 102, the PMIC 110 may provide one or more reset signals to the SoC, such as a system reset signal. Reset control logic 114 in the SoC 102 may reset PCD subsystems in response to the system reset signal or other reset signals received from the PMIC 110. Conventionally, assertion of such a system reset signal would result in resetting all PCD subsystems, including the DRAM subsystem 106, and result in the loss of the contents of the DRAM 104 upon completion of the system reset process. However, as described below, the SoC 102 may include warm reset logic 116 that causes the contents of the DRAM 104 to be preserved throughout the system reset process.

The warm reset logic 116 and reset control logic 114 may be included in an SoC subsystem, such as, for example, an "always-on" subsystem 118. The always-on subsystem 118 may be distinguished from other SoC subsystems by virtue of being a power domain that maintains the always-on subsystem 118 powered even when some or all other SoC subsystems are in a low-power or sleep state. Nevertheless, in other embodiments, such warm reset logic and reset control logic may be part of any other SoC subsystem.

The SoC 102 may also include at least one processor subsystem 120. The processor subsystem 120 may operate in part under the control of software or firmware to control operations relating to, among other things, configuring the PCD 100 to perform a selected or configured one of the warm reset, a cold reset, or other reset process in response to an error condition.

Figure 2:
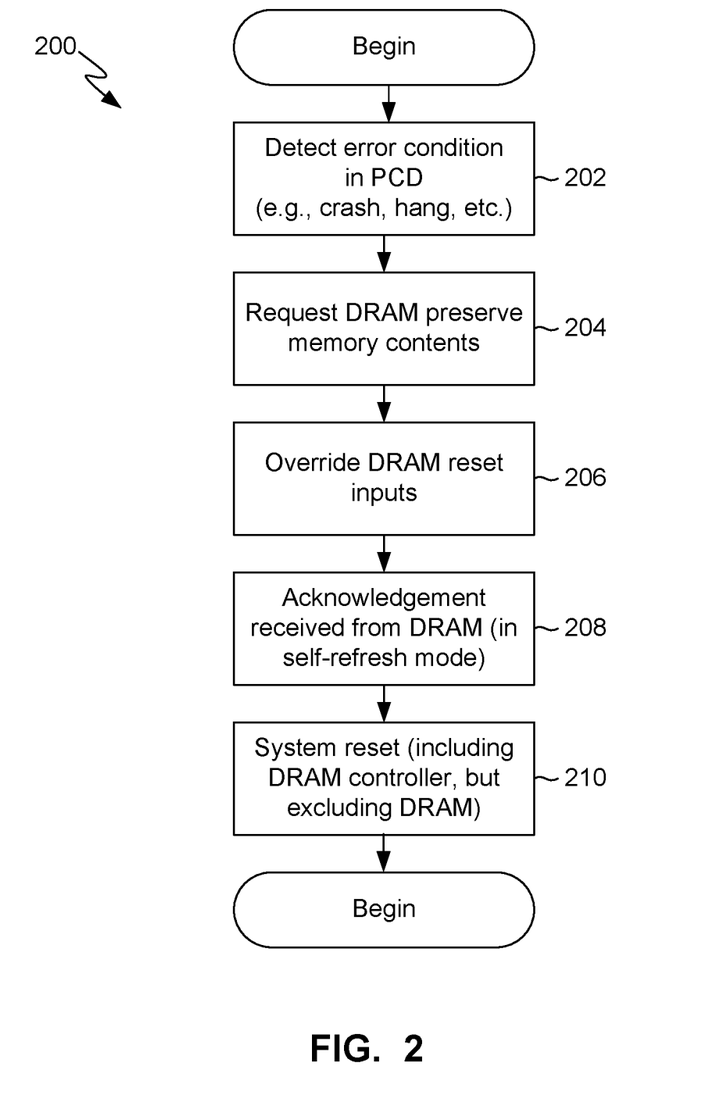
FIG. 2 is a flow diagram illustrating a method for performing a warm mission-mode reset in a PCD, in accordance with exemplary embodiments.

FIG. 2 illustrates a warm reset method 200 that may be performed in, for example, the above-described PCD 100 (FIG. 1). The term "warm reset" may be used synonymously in this disclosure with "warm mission-mode reset." The term "mission mode" refers to a mode in which the PCD 100 is operational to deliver computing device functionality to an end-user. Mission mode may be contrasted with, for example, a debug mode. The method 200 may result in the PCD 100 returning directly to mission mode (i.e., without entering any intermediate mode) after, for example, experiencing a crash, hang or other error condition. The method 200 may result in the PCD 100 returning to mission mode without cycling power and without losing the contents of the DRAM 104. As the contents of the DRAM 104 are preserved, the PCD 100 may provide the end-user with essentially the same operational or mission-mode state as before the error condition was experienced.

As indicated by block 202, the method 200 may include detecting assertion of a signal indicating an error condition in the PCD 100 (FIG. 1). Examples of such an error condition include: processing errors resulting in expiration of a watchdog timer (not shown); a measured temperature in the PCD 100 exceeding a threshold; a disruption of the power supply 112; or other conditions that impede the ordinary or mission-mode operation of the PCD 100. The SoC 102 may generate such a signal indicating an error condition in a conventional manner, as understood by one of ordinary skill in the art. Accordingly, the manner in which such error conditions may be detected and such an indication signal may be generated are not described in this disclosure.

The signal indicating an error condition may also be referred to as a reset request, i.e., a request to reset SoC subsystems in an attempt to recover from the error condition. As described below, absent the warm reset feature, or in an instance in which the PCD 100 (FIG. 1) is configured to respond to an error condition by performing a cold reset instead of a warm reset, such a signal indicating an error condition or reset request would be provided directly to the PMIC 110 irrespective of other conditions. The PMIC 110 would respond to such a signal indicating an error condition or reset request by providing a system reset signal to the SoC 102, thereby resetting all SoC subsystems. As conceptually indicated by the broken-line arrows in FIG. 1, the method 200 in effect intercepts such a signal indicating an error condition or reset request between the SoC 102 and the PMIC 110 and prevents the indication or request from being provided to the PMIC 110 until the DRAM subsystem 106 is prevented from being reset by other sources and is in a mode (e.g., self-refresh) in which the memory contents are being preserved.

As indicated by block 204, in response to the signal indicating an error condition or reset request, the warm reset logic 116 (FIG. 1) provides a signal to the DRAM subsystem 106 that requests the DRAM subsystem 106 preserve the contents of the DRAM 104. The DRAM 104 may enter a self-refresh mode in response to this request. As indicated by block 206, in response to the request to preserve memory contents, the warm reset logic 116 provides a reset override signal to the DRAM subsystem 106 that temporarily (i.e., during the warm reset process) prevents the DRAM subsystem 106 from responding to all other sources of reset signals. As indicated by block 208, the DRAM subsystem 106 may provide a signal to the warm reset logic 116 acknowledging that the DRAM subsystem 106 is preserving the memory contents (because it is in the self-refresh mode). As indicated by block 210, in response to this acknowledgement, the warm reset logic 116 may enable the PMIC 110 to perform a system reset of the SoC 102, including resetting the DRAM controller 108 of the DRAM subsystem 106. Note that the DRAM 104 itself (i.e., the core memory array containing or storing data) is not reset; rather, the DRAM 104 remains in the self-refresh mode until all other SoC subsystems have been reset. In the self-refresh mode, the DRAM 104 preserves the memory contents, i.e., the stored data. In effect, the warm reset logic 116 may enable the above-described error indication or reset request that had been temporarily suppressed or withheld from being provided to the PMIC 110 pending the acknowledgment to now be provided to the PMIC 110. The warm reset method 200 is complete when all SoC subsystems have been reset. Upon completion of the warm reset method 200, the PCD 100 is ready for mission-mode operation.

Whether the PCD 100 performs the above-described warm reset method 200 or performs a conventional cold reset method may depend upon a policy or configuration setting. A processing system, such as the above-described processor subsystem 120, may read a configuration file (not shown) or otherwise obtain policy or configuration information and use the configuration information to configure the reset control logic 114 and warm reset logic 116 (FIG. 1). For example, the processing system may detect a first configuration setting indicating that in the event of an error condition of the type described above the warm reset method 200 is to be performed rather than a conventional cold reset method or other reset method. Alternatively, the processing system may detect a different or second configuration setting indicating that in the event of an error condition of the type described above a conventional cold reset method or other reset method is to be performed rather than the warm reset method 200. Such a cold reset or other method performed in response to an indication of an error condition may be performed in a conventional manner. As a cold reset method is well understood by one of ordinary skill in the art, it is not described in this disclosure. Nevertheless, it may be noted that in a conventional reset method performed in response to an indication of an error condition, the signal from the SoC indicating the error condition or reset request would not be intercepted and suppressed or withheld from the PMIC but rather would be provided to the PMIC without regard to any other conditions.

Another policy or configuration setting may relate to whether a debug mode is provided. For example, the processing system may detect a policy or configuration setting indicating that in the event of an error condition of the type described above the warm reset method 200 is to be performed at a certain point with respect to debug operations (e.g., first pass, second pass, etc.).

Figure 3:
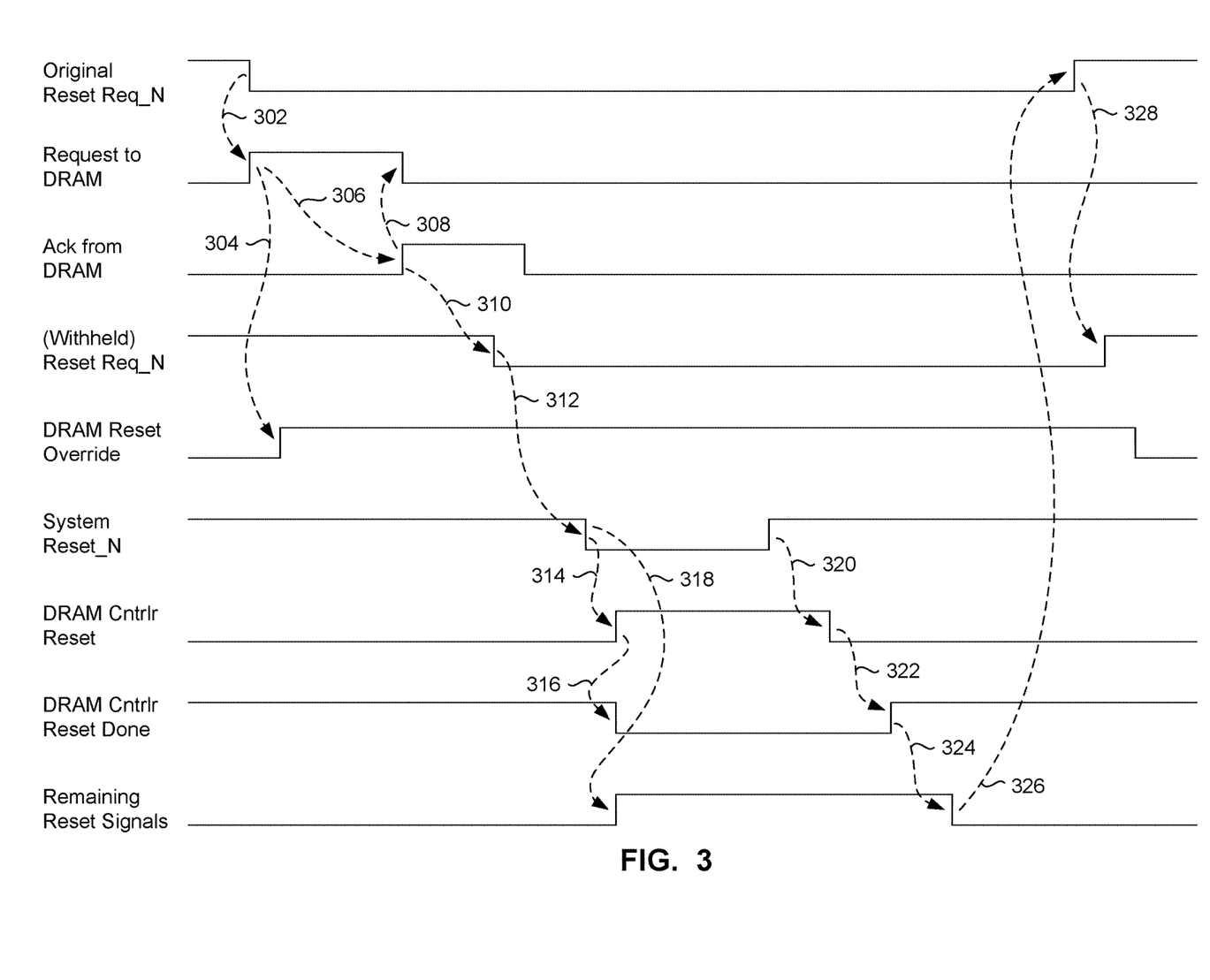
FIG. 3 is a timing diagram illustrating signals relating to systems and methods for warm mission-mode reset in a PCD, in accordance with exemplary embodiments.

FIG. 3 is a timing diagram (not to scale) illustrating examples of relationships among various signals relating to the above-described warm reset method 200. As described above, the SoC 102 asserts a reset request signal ("Original Reset Req_N") when an error condition, such as a processing crash or hang, occurs. In response 302 to assertion of the signal indicating an error condition, the warm reset logic 116 may assert a signal ("Request to DRAM") representing a request to the DRAM subsystem 106 to preserve memory contents. In response 304 to assertion of the signal indicating the request to preserve memory contents, the reset control logic 114 may assert a reset override signal ("DRAM Reset Override"). The reset override signal, while asserted, prevents any other sources of reset signals from resetting the DRAM subsystem 106. Also in response 306 to the request to preserve memory contents, the DRAM subsystem 106 may assert an acknowledgement signal ("Ack from DRAM"), acknowledging that it is in self-refresh mode. In response 308 to that acknowledgement signal, the warm reset logic 116 may then de-assert the signal ("Request to DRAM") representing the request to the DRAM subsystem 106 to preserve memory contents.

Then, in response 310 to the acknowledgement signal ("Ack from DRAM"), the warm reset logic 116 may assert a reset request signal ("Withheld Reset Req_N") that serves the same function as the above-described reset request signal ("Original Reset Req_N") that had been, in effect, withheld from the PMIC 110. In response 312 to assertion of the reset request signal ("Withheld Reset Req_N"), the PMIC 110 may assert a system reset signal ("System Reset_N"). Although not shown in FIG. 3 for purposes of clarity, with a partial exception for the DRAM subsystem 106, all SoC subsystems reset themselves in response to the system reset signal ("System Reset_N"). This exception is that, of the DRAM-related components, the DRAM 104 itself is not entirely reset. Rather, of the DRAM-related components, only the DRAM controller 108 is reset by the reset control logic 114 in response 314 to the system reset signal ("System Reset_N"), while the DRAM 104 continues to operate in self-refresh mode to preserve the memory contents. In this respect, the reset control logic 114 may assert a "DRAM Cntrlr Reset") signal. In response 316 to being reset, the DRAM controller 108 may assert an acknowledgement signal ("DRAM Cntrlr Reset Done"). In response 318 to the system reset signal ("System Reset_N") received from the PMIC 110, the reset control logic 114 may assert all other SoC subsystem reset signals (collectively, "Remaining Reset Signals").

After a time interval during which the SoC subsystems reset themselves, the PMIC 110 may de-assert the system reset signal ("System Reset_N"). In response 320 to de-assertion of the system reset signal ("System Reset_N"), the reset control logic 114 may de-assert the "DRAM Cntrlr Reset" signal. In response 322 to this de-assertion of the "DRAM Cntrlr Reset" signal, the DRAM controller 108 may de-assert the "DRAM Cntrlr Reset Done" signal. In response 324 to this de-assertion of the "DRAM Cntrlr Reset Done" signal, the reset control logic 114 may de-assert the "Remaining Reset Signals."

When all SoC subsystems have been reset (i.e., in response 326 to de-assertion of the "Remaining Reset Signals"), the processor subsystem 120, operating under the control of system software, may de-assert the "Original Reset Req_N" signal. In response 328 to this de-assertion of the "Original Reset Req_N" signal, the reset control logic 114 may de-assert the "Withheld Reset Req_N" signal. Then, the processor subsystem 120, operating under the control of software, may de-assert the "DRAM Reset Override," thereby enabling the DRAM subsystem 106 to respond to any reset inputs from other sources in the manner it would respond in normal or mission-mode operation. As the contents of the DRAM 104 are preserved during the above-described warm reset, the PCD 100 is ready to continue mission-mode operation in the same memory state as before the warm reset was begun.

Figure 4:
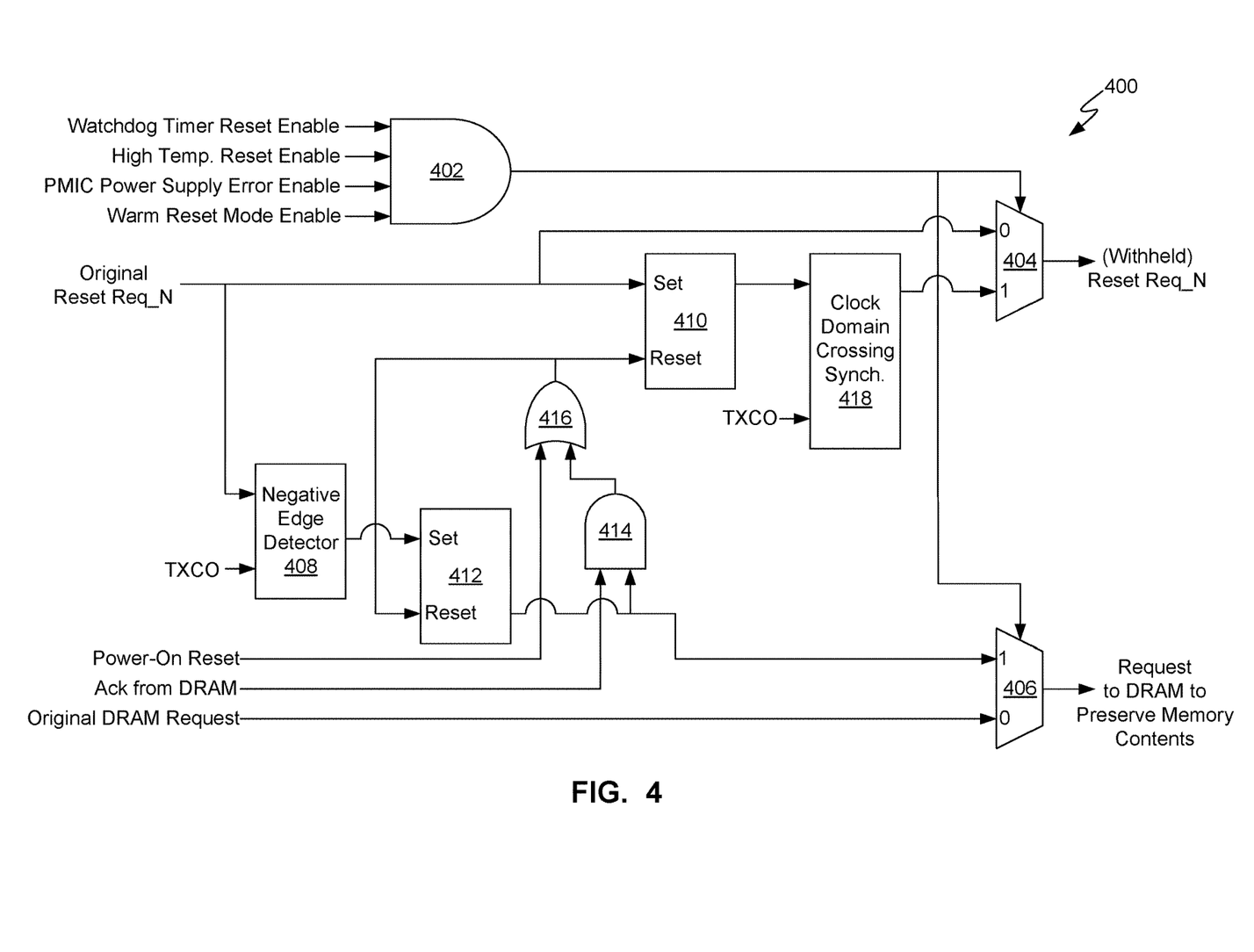
FIG. 4 is a schematic logic diagram illustrating logic relating to systems and methods for warm mission-mode reset in a PCD, in accordance with exemplary embodiments.

FIG. 4 is a schematic logic diagram illustrating an example of logic 400 relating to the signals described above with regard to FIG. 3. The logic 400 may be an example of a portion of the above-described warm reset logic 116 (FIG. 1). In this example, the warm reset may be initiated when the following conditions are true, as determined by, for example, a 4-input AND gate 402: a watchdog timer is enabled; temperature threshold detection is enabled; power supply error detection is enabled; and the warm reset mode is enabled. A conventional technique may be employed in which one or more SoC subsystems periodically reset a so-called "watchdog" timer so long as those subsystems do not experience an error condition. If a subsystem experiences an error condition, the watchdog timer may expire and an error indication may be issued. For example, the watchdog timer may expire and an error indication may therefore be issued if the processor subsystem 120 or other processing system crashes, experiences a hang (i.e., becomes unresponsive), is otherwise unable to recover from a processing error, etc. Another conventional technique may employ temperature threshold detection logic (not shown in FIG. 4) that similarly issues an error indication if a measured temperature in the PCD 100 exceeds a threshold. Still another conventional technique may be employed by the PMIC 110 to issue an error indication if the PMIC 110 detects a problem in its ability to properly supply power to the SoC 102. Any of these error conditions or other error conditions may result in assertion of the "Original Reset Req_N" signal, requesting that the SoC 102 be reset. The output of the AND gate 402 is provided to the selector input of a 2-input multiplexer 404. The output of the multiplexer 404 is the "Withheld Reset Req_N" described above with regard to FIG. 3. When the warm reset mode is not enabled, the multiplexer 404 causes the "Withheld Reset Req_N" to mirror or follow the "Original Reset Req_N" signal. However, when the warm reset mode is enabled, the multiplexer 404 causes the "Withheld Reset Req_N" to be delayed or withheld until the DRAM subsystem 106 acknowledges that it is preserving the memory contents, as described above with regard to FIG. 3.

Another DRAM request signal ("Original DRAM Request") is provided to one input of another 2-input multiplexer 406. This other or original signal may represent a request to the DRAM subsystem 106 from another source, such as the processor subsystem 120, to enter the self-refresh mode when the warm reset mode is not enabled. The output of the AND gate 402 is provided to the selector input of the multiplexer 406. When the warm reset mode is not enabled, the multiplexer 404 causes the "Withheld Reset Req_N" to mirror or follow the "Original Reset Req_N" signal. When the warm reset mode is enabled, the multiplexer 406 outputs the "Request to DRAM" signal described above with regard to FIG. 3. The remaining portion of the logic 400 relates to delaying or withholding the reset request until the DRAM subsystem 106 acknowledges that it is preserving the memory contents.

The "Original Reset Req_N" signal is provided to the input of a negative edge detector 408 and to the Set input of a set-reset ("S-R") flip-flop 410. A negative edge or transition from a logic-high level to a logic-low level indicates assertion of this signal. The negative edge detector 408 is clocked by a free-running crystal oscillator signal "TXCO." The output of the negative edge detector 408 is provided to the Set input of another S-R flip-flop 412. The output of the S-R flip-flop 410 is provided to the other input of the above-described multiplexer 406 and to one input of a 2-input AND gate 414. The "Ack from DRAM" signal described above with regard to FIG. 3 is provided to the other input of the AND gate 414. The output of the AND gate 414 is provided to one input of a 2-input OR gate 416. A "Power-On Reset" or "POR" signal that is asserted when a POR is initiated is provided to the other input of the OR gate 416. The output of the OR gate 416 is provided to the Reset inputs of the S-R flip-flops 410 and 412. The S-R flip-flop 410 is set when the "Original Reset Req_N" signal returns to a logic-high level, i.e., is de-asserted. A clock domain crossing synchronizer 418 synchronizes the output of the S-R flip-flop 410 with the "TXCO" clock signal. The output of the clock domain crossing synchronizer 418 is provided to the other input of the above-described 2-input multiplexer 404. It should be understood that while FIG. 4 illustrates exemplary logic 400 and FIG. 3 illustrates corresponding exemplary signal timing, other warm reset logic that is within the scope of this disclosure may occur readily to one of ordinary skill in the art in view of these examples.

Figure 5:
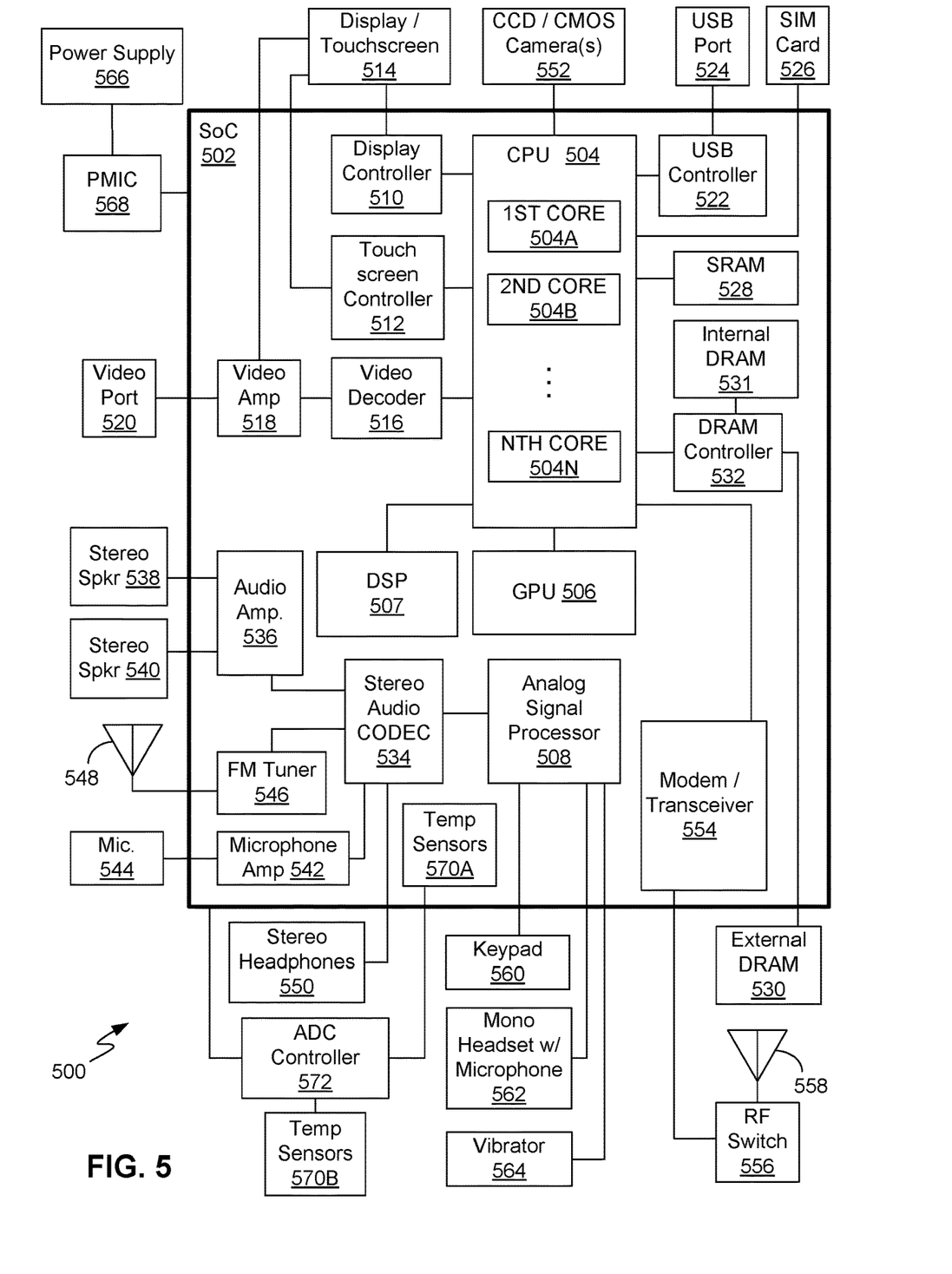
FIG. 5 is a block diagram of a PCD, in accordance with exemplary embodiments.

As illustrated in FIG. 5, exemplary embodiments of systems and methods for performing a warm mission-mode reset may be embodied in a PCD 500. The PCD 500 includes an SoC 502. The PCD 500 and SoC 502 may be examples of the PCD 100 and SoC 102, respectively, described above with regard to FIG. 1. The SoC 502 may include a CPU 504, a GPU 506, a DSP 507, an analog signal processor 508, or other processors. The CPU 504 may include multiple cores, such as a first core 504A, a second core 504B, etc., through an Nth core 504N. Any such processor or core may be an example of the above-described processor subsystem 120 (FIG. 1) and may be capable of determining that an error condition has occurred, which may result in assertion of the above-described "Original Reset Req_N" signal. It should be understood that interconnections among the various PCD and SoC components are shown in a conceptual manner in FIG. 5. Such components may be interconnected by one or more data signal communication buses or other interconnects (not shown for purposes of clarity).

A display controller 510 and a touchscreen controller 512 may be coupled to the CPU 504. A touchscreen display 514 external to the SoC 502 may be coupled to the display controller 510 and the touchscreen controller 512. The PCD 500 may further include a video decoder 516 coupled to the CPU 504. A video amplifier 518 may be coupled to the video decoder 516 and the touchscreen display 514. A video port 520 may be coupled to the video amplifier 518. A universal serial bus ("USB") controller 522 may also be coupled to CPU 504, and a USB port 524 may be coupled to the USB controller 522. A subscriber identity module ("SIM") card 526 may also be coupled to the CPU 504.

One or more memories may be coupled to the CPU 504. The one or more memories may include both volatile and non-volatile memories. Examples of volatile memories include static random access memory ("SRAM") 528 and dynamic RAMs ("DRAM"s) 530 and 531. Such memories may be external to the SoC 502, such as the DRAM 530, or internal to the SoC 502, such as the DRAM 531. A DRAM controller 532 coupled to the CPU 504 may control the writing of data to, and reading of data from, the DRAMs 530 and 531. In other embodiments, such a DRAM controller may be included within a processor, such as the CPU 504. The DRAMs 530 and 531 and DRAM controller 532 may comprise examples of the DRAM 104 and DRAM controller 108, respectively, described above with regard to FIG. 1.

A stereo audio CODEC 534 may be coupled to the analog signal processor 508. Further, an audio amplifier 536 may be coupled to the stereo audio CODEC 534. First and second stereo speakers 538 and 540, respectively, may be coupled to the audio amplifier 536. In addition, a microphone amplifier 542 may be coupled to the stereo audio CODEC 534, and a microphone 544 may be coupled to the microphone amplifier 542. A frequency modulation ("FM") radio tuner 546 may be coupled to the stereo audio CODEC 534. An FM antenna 548 may be coupled to the FM radio tuner 546. Further, stereo headphones 550 may be coupled to the stereo audio CODEC 534. Other devices that may be coupled to the CPU 504 include one or more digital (e.g., CCD or CMOS) cameras 552, such as a front-facing camera and a rear-facing camera with respect to opposing sides of a PCD housing (not shown).

A modem or RF transceiver 554 may be coupled to the analog signal processor 508. An RF switch 556 may be coupled to the RF transceiver 554 and an RF antenna 558. In addition, a keypad 560, a mono headset with a microphone 562, and a vibrator device 564 may be coupled to the analog signal processor 508.

A power supply 566 may be coupled to the SoC 502 via a power management integrated circuit ("PMIC") 568. The power supply 566 may include a rechargeable battery or a DC power supply that is derived from an AC-to-DC transformer connected to an AC power source. The power supply 566 and PMIC 568 may be examples of the above-described power supply 112 and PMIC 110 (FIG. 1).

The SoC 502 may have one or more internal or on-chip thermal sensors 570A and may be coupled to one or more external or off-chip thermal sensors 570B. An analog-to-digital converter ("ADC") controller 572 may convert voltage drops produced by the thermal sensors 570A and 570B to digital signals. The SoC 502 may be configured to determine whether temperatures measured using the thermal sensors 570A and 570B exceed a threshold and thus represent an error condition, which may result in assertion of the above-described "Original Reset Req_N" signal.

The touch screen display 514, the video port 520, the USB port 524, the camera 552, the first stereo speaker 538, the second stereo speaker 540, the microphone 544, the FM antenna 548, the stereo headphones 550, the RF switch 556, the RF antenna 558, the keypad 560, the mono headset 562, the vibrator 564, the thermal sensors 550B, the ADC controller 552, the PMIC 568, the power supply 566, the DRAM 530, and the SIM card 526 are external to the SoC 502 in this exemplary embodiment. It will be understood, however, that in other embodiments one or more of these devices may be included in such an SoC.

The method 200 (FIG. 2) or other methods within the scope of this disclosure may, in some embodiments, be controlled or achieved through the execution of firmware or software in a processing system comprising one or more processors and memories. Any PCD memory or other memory or storage medium having such firmware or software or a portion thereof stored thereon in computer-readable form may be an example of a "computer program product," "computer-readable medium," etc., as such terms are understood in the patent lexicon.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for performing a warm reset in a portable computing device ("PCD"), comprising:
  detecting assertion of a signal indicating an error condition;
  providing a signal indicating a request to preserve memory contents to a dynamic random access memory ("DRAM") subsystem in response to assertion of the signal indicating the error condition;
  asserting a system reset signal based on a signal acknowledging the DRAM subsystem is preserving the memory contents; and
  preventing the signal indicating the error condition from being transmitted from a system- on-chip ("Sort") to a power management integrated circuit ("PMIC") until the DRAM subsystem has acknowledged the memory contents are being preserved.

2. The method of claim 1, further comprising:
  the DRAM subsystem entering a self-refresh mode in response to the signal indicating the request to preserve memory contents; and
  the DRAM subsystem generating the signal acknowledging the DRAM subsystem is preserving the memory contents after the DRAM subsystem has entered the self-refresh mode.

3. The method of claim 1, further comprising temporarily preventing the DRAM subsystem from responding to all reset signal inputs in response to the signal indicating the request to preserve memory contents.

4. The method of claim 1, wherein the DRAM subsystem is prevented from responding to all reset signal inputs until after the PMIC receives the signal indicating the error condition.

5. The method of claim 1, further comprising:
  detecting, by a processor, a signal acknowledging completion of resetting of all PCD subsystems; and
  de-asserting, by the processor, the signal indicating the error condition.

6. The method of claim 1, further comprising:
  detecting a first configuration setting indicating to, in response to assertion of the signal indicating the error condition, perform a warm reset of the PCD and not perform a cold reset of the PCD;
  intercepting and suppressing the signal indicating the error condition in response to detection of the first configuration setting;
  detecting a second configuration setting indicating to, in response to assertion of the signal indicating the error condition, perform a cold reset of the PCD and not perform a warm reset of the PCD; and
  refraining from intercepting and suppressing the signal indicating the error condition in response to detection of the second configuration setting.

7. The method of claim 1, wherein the PCD is one of: a cellular telephone, a tablet computer, a palmtop computer, a portable digital assistant, or a portable game console.

8. A system for performing a warm reset in a portable computing device ("PCD"), comprising:
  means for detecting assertion of a signal indicating an error condition;
  means for providing a signal indicating a request to preserve memory contents to a dynamic random access memory ("DRAM") subsystem in response to assertion of the signal indicating an error condition;
  means for asserting a system reset signal based on a signal acknowledging the DRAM subsystem is preserving the memory contents; and
  means for preventing the signal indicating the error condition from being transmitted from a system-on-chip ("Sort") to a power management integrated circuit ("PMIC") until the DRAM subsystem has acknowledged the memory contents are being preserved.

9. The system of claim 8, further comprising:
  means for entering the DRAM subsystem into a self-refresh mode in response to the signal indicating the request to preserve memory contents; and
  means for generating, by the DRAM subsystem, the signal acknowledging the DRAM subsystem is preserving the memory contents after the DRAM subsystem has entered the self- refresh mode.

10. The system of claim 8, further comprising means for temporarily preventing the DRAM subsystem from responding to all reset signal inputs in response to the signal indicating the request to preserve memory contents.

11. The system of claim 8, wherein the DRAM subsystem is prevented from responding to all reset signal inputs until after the PMIC receives the signal indicating the error condition.

12. The system of claim 8, further comprising:
  means for detecting a signal acknowledging completion of resetting of all PCD subsystems; and
  means for de-asserting the signal indicating the error condition.

13. The system of claim 8, further comprising:
  means for detecting a first configuration setting indicating to, in response to assertion of the signal indicating the error condition, perform a warm reset of the PCD and not perform a cold reset of the PCD;
  means for intercepting and suppressing the signal indicating the error condition in response to detection of the first configuration setting;
  means for detecting a second configuration setting indicating to, in response to assertion of the signal indicating the error condition, perform a cold reset of the PCD and not perform a warm reset of the PCD; and means for refraining from intercepting and suppressing the signal indicating the error condition in response to detection of the second configuration setting.

14. The system of claim 8, wherein the PCD is one of: a cellular telephone, a tablet computer, a palmtop computer, a portable digital assistant, or a portable game console.

15. A system for performing a warm reset in a portable computing device ("PCD"), comprising:
   a memory controller configured to control a dynamic random access memory ("DRAM") subsystem;
   a power management integrated circuit ("PMIC") configured to receive a signal from a system-on-chip ("SoC") indicating an error condition in the PCD; and
   warm reset logic in the SoC configured to
      detect assertion of the signal directed to the PMIC indicating an error condition; and
      provide a signal to the memory controller indicating a request to preserve memory contents in response to assertion of the signal indicating an error condition, wherein the PMIC is configured to provide a system reset signal to the SoC based on a signal from the memory controller acknowledging the DRAM subsystem is preserving the memory contents; wherein the warm reset logic is configured to prevent the signal indicating the error condition from being received by the PMIC until the memory controller has acknowledged the memory contents are being preserved.

16. The system of claim 15, wherein:
   the DRAM subsystem is configured to enter a self-refresh mode in response to the signal indicating the request to preserve memory contents; and
   the DRAM subsystem is configured to generate the signal acknowledging the DRAM subsystem is preserving the memory contents after the DRAM subsystem has entered the self- refresh mode.

17. The system of claim 15, wherein the warm reset logic is configured to temporarily prevent the DRAM subsystem from responding to all reset signal inputs in response to the signal indicating the request to preserve memory contents.

18. The system of claim 15, wherein the DRAM subsystem is prevented from responding to all reset signal inputs until after the PMIC receives the signal indicating the error condition.

19. The system of claim 15, wherein the SoC further includes a processor configured to:
   detect a signal acknowledging completion of resetting of all PCD subsystems; and
   de-assert the signal indicating the error condition.

20. The system of claim 15, further comprising reset control logic configured to:
   detect a first configuration setting indicating to, in response to assertion of the signal indicating the error condition, perform a warm reset of the PCD and not perform a cold reset of the PCD;
   intercept and suppress the signal indicating the error condition in response to detection of the first configuration setting;
   detect a second configuration setting indicating to, in response to assertion of the signal indicating the error condition, perform a cold reset of the PCD and not perform a warm reset of the PCD; and
   refrain from intercepting and suppressing the signal indicating the error condition in response to detection of the second configuration setting.

21. The system of claim 15, wherein the PCD is one of: a cellular telephone, a tablet computer, a palmtop computer, a portable digital assistant, or a portable game console.

22. A system-on-chip ("SoC") configured to provide a warm reset in a portable computing device ("PCD"), comprising:
   warm reset logic configured to detect assertion of a signal indicating an error condition in the PCD and to provide a signal to a memory controller of a dynamic random access memory ("DRAM") subsystem indicating a request to preserve memory contents in response to assertion of the signal indicating an error condition; and
   reset control logic configured to reset all SoC subsystems based on an acknowledgment that the memory controller is preserving the memory contents, wherein the memory contents are preserved after all SoC subsystems have been reset wherein the warm reset logic is configured to prevent the signal indicating the error condition from being received by a power management integrated circuit ("PMIC") until the memory controller has acknowledged the memory contents are being preserved.

23. The SoC of claim 22, wherein the warm reset logic is configured to temporarily prevent the DRAM subsystem from responding to all reset signal inputs in response to the signal indicating the request to preserve memory contents.

24. The SoC of claim 22, wherein the reset control logic is configured to prevent the DRAM subsystem from responding to all reset signal inputs until after the PMIC receives the signal indicating the error condition.

25. The SoC of claim 22, wherein the SoC further includes a processor configured to:
   detect a signal acknowledging completion of resetting of all PCD subsystems; and
   de-assert the signal indicating the error condition.

26. The SoC of claim 22, wherein the reset control logic is further configured to:
   detect a first configuration setting indicating to, in response to assertion of the signal indicating the error condition, perform a warm reset of the PCD and not perform a cold reset of the PCD;
   intercept and suppress the signal indicating the error condition in response to detection of the first configuration setting;
   detect a second configuration setting indicating to, in response to assertion of the signal indicating the error condition, perform a cold reset of the PCD and not perform a warm reset of the PCD; and
   refrain from intercepting and suppressing the signal indicating the error condition in response to detection of the second configuration setting.

* * * * *